United States Patent [19]

Yelin et al.

[11] 3,837,798

[45] Sept. 24, 1974

[54] POLYESTER MODIFICATION WITH AN OXIDIZING CHEMICAL

[75] Inventors: Robert E. Yelin, Willingboro, N.J.; James E. Hendrix, New Orleans, La.; Ralph F. Villiers, Mexico, Mexico

[73] Assignee: FMC Corporation, New York, N.Y.

[22] Filed: Dec. 15, 1971

[21] Appl. No.: 208,386

[52] U.S. Cl............................ 8/115.5, 8/168, 8/179, 8/DIG. 4, 8/DIG. 6, 260/75 T
[51] Int. Cl........................ D06m 5/06, D06p 3/52
[58] Field of Search............ 8/DIG. 4, DIG. 6, 168, 8/115.5; 260/75 T

[56] References Cited
UNITED STATES PATENTS

| 3,029,121 | 4/1962 | Collins | 8/168 X |
| 3,035,881 | 5/1962 | Cohen et al. | 260/75 T X |

*Primary Examiner*—Leon D. Rosdol
*Assistant Examiner*—H. Wolman

[57] ABSTRACT

This invention provides a process for treating polyester materials employing an aqueous treatment solution containing an oxidizing chemical whereby the cotton-like hand of the polyester is improved and the polyester is made cationically dyeable.

4 Claims, No Drawings

POLYESTER MODIFICATION WITH AN OXIDIZING CHEMICAL

This invention concerns the modification of polyester fibers of the type suitable for the manufacture of textiles in which the cotton-like hand is improved and the fiber is made cationically dyeable.

Polyester fibers like other man made fibers are usually white and therefore do not require bleaching of the type normally required for natural fibers such as cotton. However, polyester fibers are usually difficult to dye with cationic dyes. This difficulty has been overcome by adding specialized monomers prior to polymerization. This is known in the trade as "ionic incorporation" into the resulting polyester which permits cationic dyeing. However, such techniques of imparting cationic dyeability alter the backbone of the polyester which is often detrimental to the cloth making qualities of the polyester material.

It would be advantageous if already polymerized non-cationically dyeable polyester fiber could be modified and made cationically dyeable. Such a post polymerization treatment is provided by this invention having the significant technical advantages of making available polyester material cationically dyeable, and improving its hand without affecting the excellent cloth making property of the polyester and without the extra expense of employing modified or specialized monomers to produce a cationically dyeable polyester.

This invention, described in summary form provides a process for treating polyester material of the type suitable for the production of textiles to improve the cotton-like hand of the polyester and make it cationically dyeable. The process consists of contacting the polyester material with an aqueous solution containing an oxidizing chemical selected from the group consisting of acidic hypochlorite, peroxymonosulfuric acid, peracetic acid, dichromates and permanganates at a temperature near or at the boiling point of the solution for sufficient time to modify the polyester (at least about 20 minutes). Adjusting the pH of the solution improves the process by increasing the reactivity of the solution. The total concentration of the oxidizing chemical in the solution should be at least about 1 percent with a concentration between 5 percent and 25 percent preferred. The ratio of solution to polyester material being treated should be between 1:1 and 100:1 with 20:1 being preferred. The concentration of oxidizing chemical and the ratio of solution to polyester should be sufficient to yield at least about 1% and preferably about 100 percent by weight, oxidizing chemical based upon the weight of the polyester being treated.

Specifically, polyester material is treated by the process of this invention with an aqueous solution containing an oxidizing chemical selected from the group consisting of acidic hypochlorite, peroxymonosulfuric acid, peracetic acid, dichromates and permanganates, at a temperature near or at the boiling point of the solution (at least 80°C) for sufficient time to improve the cotton-like hand of the polyester material and impart cationic dyeability.

Examples of suitable dichromates are potassium dichromate, sodium dichromate, lithium dichromate, and the like water-soluble salts. Examples of suitable permanganates are potassium permanganate, sodium permanganate and the like water-soluble salts.

The polyester material for which this process is useful is that type of polyester suitable for weaving or producing textiles. The characteristics of such polyester material are well known in the textile art. Such polyester material has been defined in Chemical Process Monograph, No. 25, "Man Made Fiber Processing", 1966, by Authur Alexander and published by Noyes Development Corporation, at page 77 as ". . . any fiber in which the fiber-forming substance is any long chain synthetic polymer composed of at least 85 percent by weight of an ester of a dihydric alcohol and terephthalic acid (p-$HOOC-C_6H_4-COOH$)." Preferably the polyester is that type of polyester normally used for producing cloth consisting of 100 percent polyester of polyester-cotton blends. Such polyesters are well known and sold under trade names such as Dacron and Kodel. The polyester material can be in the form of resin chips or fibers, preferably the polyester is spun into fibers. However, the polyester should be treated before it is blended with cotton or other natural fibers since the process of this invention is too harsh for natural textile fibers.

Cationic dyeing of fibers is a well known process in the textile industry. Examples of cationic dyes are Sevron Blue ER, Basic Green No. 4 (Malachite Green) and Basic Blue No. 9 (Methylene Blue).

The concentration of the oxidizing chemical in the solution can vary significantly without affecting the properties imparted to the polyester as a result of the treatment process. The concentration of oxidizing chemical in the solution should be at least 1 percent, with a concentration between 5 and 25 percent preferred.

The ratio of treatment solution to polyester material can vary from a ratio of at least about 1:1 to as high as 100 parts treatment solution per part of polyester. Ratios greater than 100:1 require a large amount of treatment solution which decreases the economy of the process. A ratio of treatment solution to polyester of between 5:1 and 40:1 is preferred with about 20:1 particularly preferred. From these preferred values for the concentration of oxidizing chemical in solution and preferred ratio of solution to polyester the preferred amount of oxidizing chemical based upon the weight of polyester being treated is calculated to be between 25 percent and 1000 percent with 100 percent particularly preferred.

The reactivity of the treatment solution can be increased by adjusting the pH from the natural pH of the treatment solution. While the natural pH is adequate, preferred reaction rates are obtained at specific pH values dependent upon the oxidizing chemical employed. Many acids, especially the mineral acids are suitable for lowering the pH of the treatment solution. Examples of suitable acids for adjusting the pH of the treatment solution are hydrochloric acid, sulfuric acid, and the like. Sodium dihydrogen phosphate can also be used to adjust the pH of the treatment solution. Both the preferred pH and the natural pH of the treatment solution depends upon the oxidizing chemical employed. The preferred pH range for the treatment solution for each oxidizing chemical are as follows: acidic hypochlorite, preferred pH range between 1 and 3; peroxymonosulfuric acid, preferred pH range between 0 and 2; peracetic acid, preferred pH range between 0 and 2; dichromates, preferred pH range between 0 and 2; and permanganates, preferred pH range between 0 2.

The temperature of the solution during treatment is important and should be near or at the boiling point. The boiling temperature of about 100°C at normal atmospheric pressure is preferred. Elevated pressures can be employed to permit temperatures above 100°C (up to 120°C) which reduces the reaction time. Temperatures near the boiling point e.g. 80°C to 100°C or boiling at reduced pressure are useful though not preferred.

The treatment time is not critical and can vary from about 20 minutes up to several hours. Selection of the treatment time is determined by the degree of modification of the polyester desired and the process pressure and temperature employed. With temperatures of about 100°C or higher short treatment times (20 minutes to one hour) are adequate while at lower temperatures (80°C to 100°C) longer treatment times (1–3 hours) may be desired. However, since the treatment is not noticeably detrimental to the cloth making qualities of the polyester, the higher treatment temperatures of about 100°C or higher, e.g. up to 120°C, can be used with treatment times in excess of one hour.

The treatment process is performed by contacting the polyester and treatment solution by conventional means, for example, the polyester material can be immersed in a batch of treatment solution maintained at the desired temperature and then separated and washed after the treatment time has elapsed. Alternatively, the process can be performed continuously employing a J-box into which the polyester fibers already impregnated with treatment solution are continuously fed at a rate sufficient to provide a retention time in the J-box equal to the desired treatment time. When a J-box is used, steam is usually fed into the J-box along with the material to provide the desired treatment temperature.

Standardized testing procedures described in Example 1 were employed in all of the examples to analyze the effects of the treatment process upon polyester samples. All proportions used herein are based upon weight unless otherwise specified.

EXAMPLE 1

A sample of material consisting of typical polyester cloth obtained from a standard source (Type 54 spun Dacron woven fabric, lot 4077, style 754 AW, obtained from Testfabrics Inc., 55 Van Dam Street, New York, 10013) was boiled for 60 minutes at about 100°C in an aqueous treatment solution containing 5 g. of acidic hypochlorite per 100 mil. of treatment solution and having a pH of 2 (obtained by adding sufficient $H_2SO_4$). The treatment solution was used at a ratio of 20 parts treatment solution per part of sample material. After 60 minutes the material was removed from the solution, washed with water, scoured and dyed with a cationic dye (Sevron Blue ER) employing a standard dyeing procedure.

After dyeing the sample was washed with a detergent, rinsed and the degree of dyeing was analyzed employing a Hunterlab D–40 reflectometer using a green filter. From the reflectances obtained with the reflectometer, a K/S ratio was determined employing the following formula:

$K/S = (1-R)^2/2R$ wherein R is the percent reflectance and K/S is the ratio of absorption coefficient to scattering coefficient. The significance of K/S values obtained by the above method is that low K/S values correspond to (a) low absorbency, (b) high reflectance, and (c) low degree of dyeing. In addition the carboxyl group content of the polyester was measured in terms of equivalents of —COOH per $10^6$ g. of polyester. Increases in carboxyl (anion) group content indicates that the treated material will be more receptive to cationic dyeing. The results of the tests are reported in Table I. Furthermore, testing of the treated cloth for properties which indicate its cloth making qualities, indicated that there were no detrimental effects upon the polyester as a result of the process. In addition the cloth-like feel (hand) of the polyester was improved in that its feel was more cotton-like. The procedure of this example was repeated to obtain a comparison by using plain water as the treatment solution. The results of the water blank are also reported in Table I.

EXAMPLES 2, 3, 4 and 5

The procedure used in Example 1 was repeated with samples of the same type test fabric (different lots) and employing treatment solutions as follows. Example 2, 25 percent peroxymonosulfuric acid ($HOOSO_3H$) having a pH of 1.3. Example 3, 12 percent peracetic acid ($CH_3COOOH$) having a pH of less than 1.0. Example 4, a 5 percent permanganate solution ($KMnO_4$) having a pH of less than 1.0. Example 5, a 5 percent dichromate having a pH of less than 1.0. The same tests were preformed as in Example 1 and the results of the tests are reported in Table I. Furthermore, testing of the treated cloth for properties which indicate its cloth making qualities, indicated that there were no detrimental effects upon the polyester as a result of the process. In addition the cloth-like feel (hand) of the polyester was improved in that its feel was more cotton-like. The procedure of these examples was repeated to obtain a comparison by using plain water as the treatment solution. The results of the water blanks are also reported in Table I.

Synthetic materials of the type suitable for producing textile fibers can be treated by the process to provide the expected results of ionic incorporation or oxidation such as carboxyl group incorporation into polyester. Examples of such synthetic materials in addition to polyester are acrylics, polyamides, polyethylene, and the like. The process results in improved properties for the treated material and fabrics produced from the treated material. Properties of fabrics that are improved by ionic incorporation or oxidization include cationic dyeability, moisture regain and retention, electrostatic charge dissipation, adherence between fabric and textile finishes, soil release and/or soil repellence.

TABLE I

| Example No. | K/S ratio | Carboxyl content |
|---|---|---|
| 1 (hypochlorite) | 0.55 | 62.2 |
| water blank | 0.13 | 19.2 |
| 2 (permonosulfuric) | 0.47 | 24.8 |
| water blank | 0.12 | 19.2 |
| 3 (peracetic) | 0.38 | 38.7 |
| water blank | 0.12 | 19.2 |
| 4 (permanganate) | 0.21 | 34.9 |
| water blank | 0.13 | 26.3 |
| 5*(dichromate) | 2.4 | 68.1 |
| water blank | 0.13 | 26.3 |

*With dichromate the fabric strength appeared to be slightly affected.

What is claimed is:

1. A process for treating linear polyester fibers of the type suitable for the production of textiles to improve the cotton-line hand of the polyester and impart cationic dyeability, comprising contacting the polyester fiber with an aqueous treatment solution at a temperature of at least 80°C for a treatment time of at least 20 minutes and at a ratio of treatment solution to polyester of between 1:1 and 100:1, said treatment solution containing at least 1 percent of an oxidizing chemical selected from the group consisting of acidic hypochlorite and peroxymonosulfuric acid, the pH of the solution containing acidic hypochlorite being adjusted to between 1 and 3 by adding a mineral acid to the solution, the pH of the solution containing peroxymonosulfuric acid being adjusted to between 0 and 2 by adding a mineral acid to the solution.

2. The process of claim 1 in which the temperature of the treatment solution is the boiling temperature, the ratio of treatment solution to polyester is between 5:1 and 40:1 and the treatment solution contains between 5 and 25 percent oxidizing chemical.

3. The process of claim 2 in which the oxidizing chemical is acidic hypochlorite and the pH of the treatment solution is adjusted with a mineral acid to between 1 and 3.

4. The process of claim 2 in which the oxidizing chemical is peroxymonosulfuric acid and the pH of the treatment solution is adjusted with a mineral acid to between 0 and 2.

* * * * *